June 1, 1954

A. R. BUCHHOLZ 2,679,849

COIN-COUNTING MACHINE

Filed Dec. 10, 1951

INVENTOR.
Arnold R. Buchholz
BY
Marles & French
Attys.

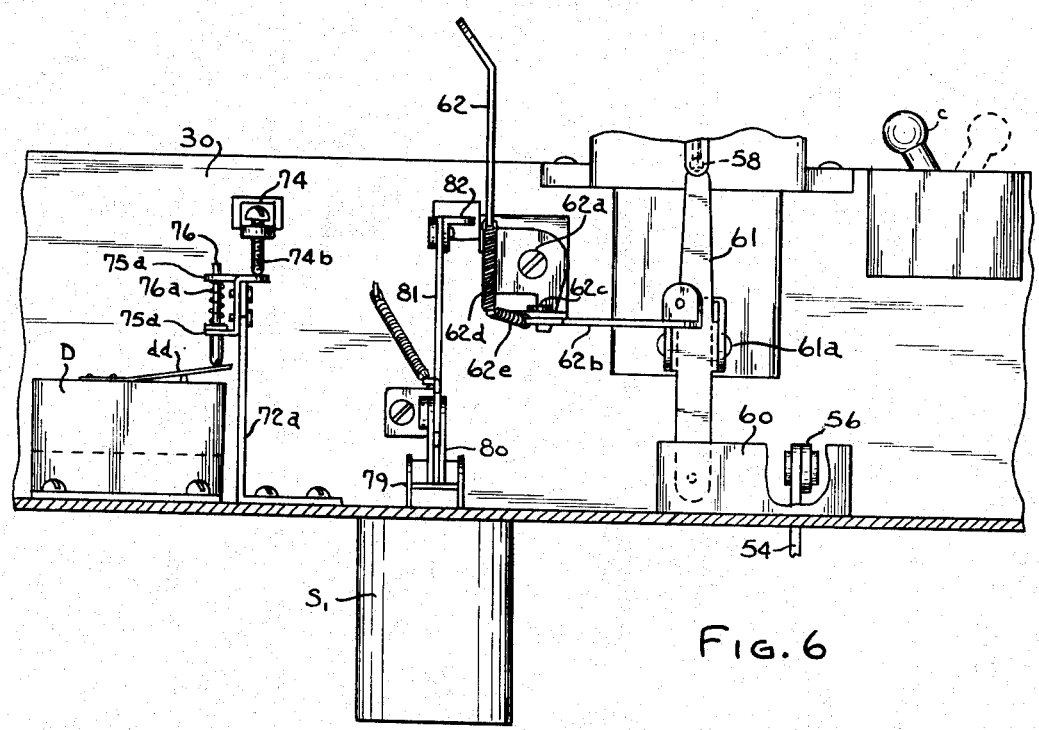
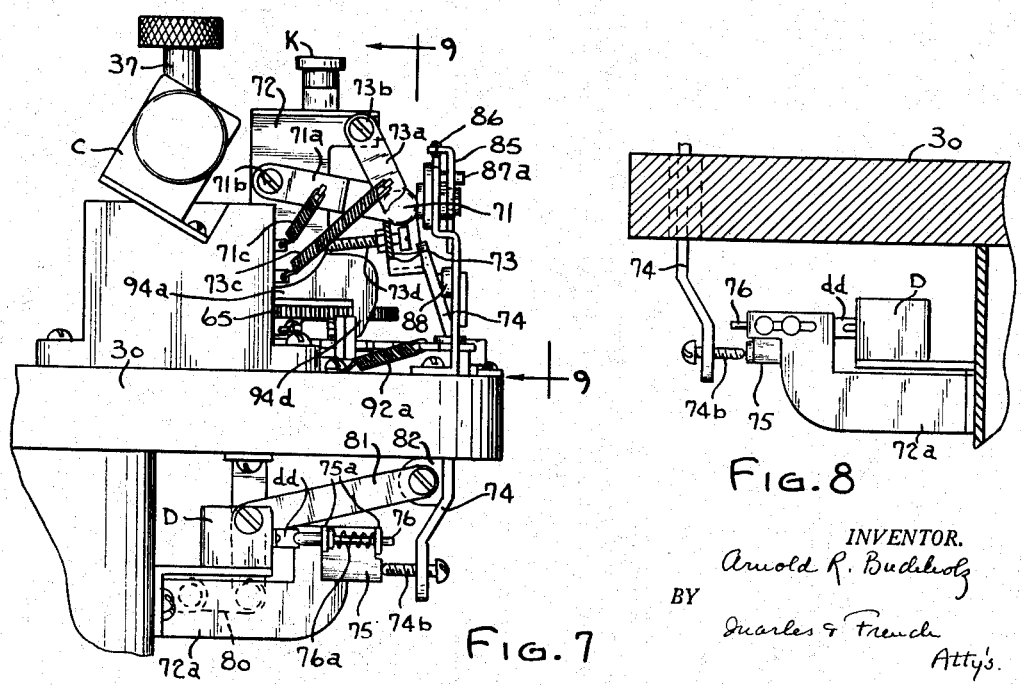

June 1, 1954  A. R. BUCHHOLZ  2,679,849
COIN-COUNTING MACHINE
Filed Dec. 10, 1951  9 Sheets-Sheet 6
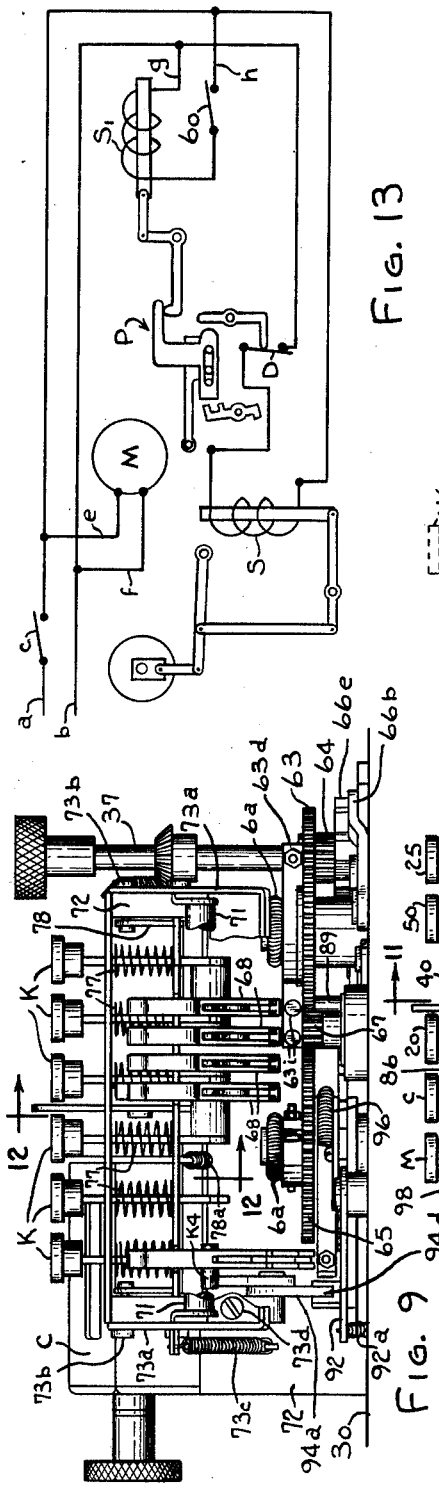
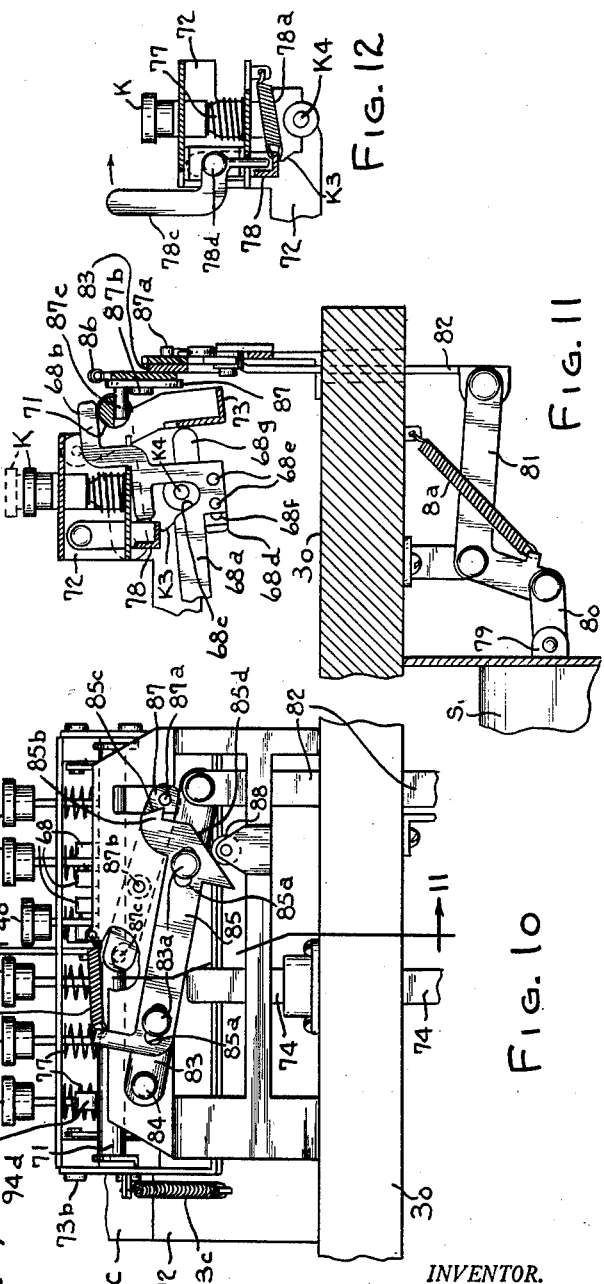
INVENTOR.
Arnold R. Buchholz
BY
Charles & French
Att'ys.

June 1, 1954  A. R. BUCHHOLZ  2,679,849
COIN-COUNTING MACHINE
Filed Dec. 10, 1951  9 Sheets-Sheet 7
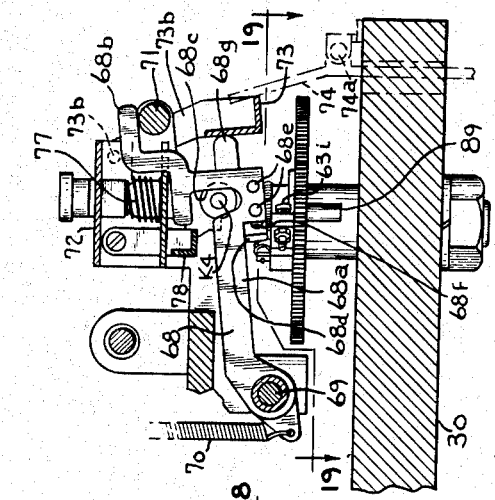
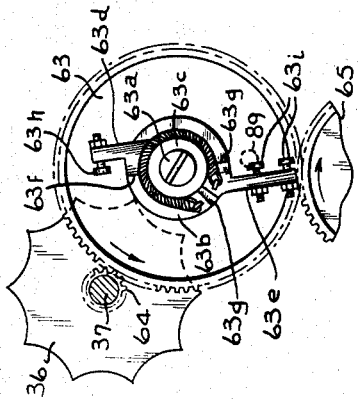
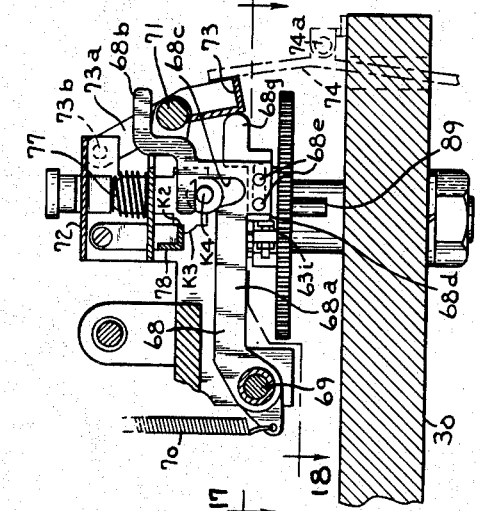
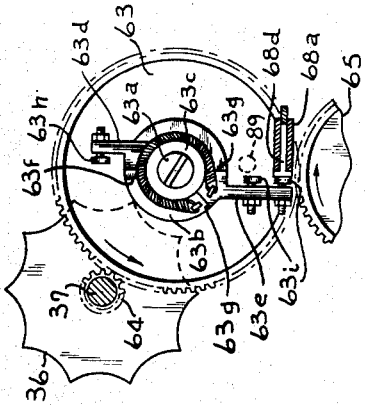
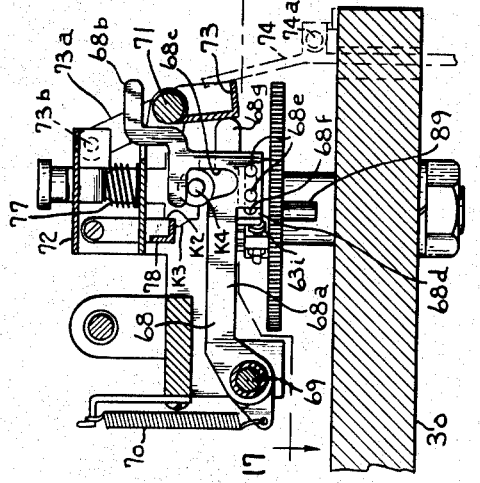
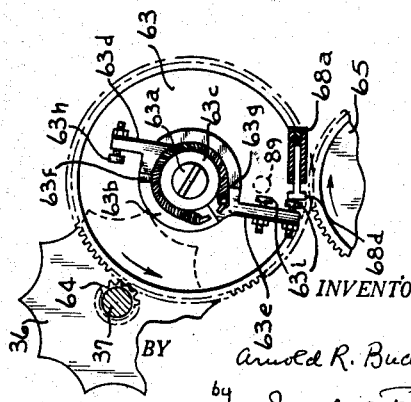
INVENTOR.
Arnold R. Buchholz
BY Quarles & French
Att'ys June 1, 1954  A. R. BUCHHOLZ  2,679,849
COIN-COUNTING MACHINE
Filed Dec. 10, 1951  9 Sheets-Sheet 8

INVENTOR.
Arnold R. Buchholz
BY
Marles & French
Att'ys.

June 1, 1954  A. R. BUCHHOLZ  2,679,849
COIN-COUNTING MACHINE
Filed Dec. 10, 1951  9 Sheets-Sheet 9

INVENTOR.
Arnold R. Buchholz
BY Charles P. French
Attys.

Patented June 1, 1954

2,679,849

UNITED STATES PATENT OFFICE 2,679,849

COIN-COUNTING MACHINE

Arnold R. Buchholz, Watertown, Wis., assignor to Brandt Automatic Cashier Company, Watertown, Wis., a corporation of Wisconsin Application December 10, 1951, Serial No. 260,860

11 Claims. (Cl. 133—8)

The invention relates to coin counting machines.

The general object of the invention is to provide a coin counting machine of the type in which the coins to be counted are deposited in a hopper having a rotary bottom by which the coins are moved outwardly by centrifugal force to the outer side of the hopper and delivered, one at a time, under a rotating feed wheel which carries the coins to a coin star or drive wheel which is given a partial rotation by the coin as it passes to a delivery passage. The operative position of the feed wheel is controlled by count control mechanism which is settable to provide for either an unlimited or continuous delivery of coins or for predetermined numbers of coins to be delivered. The present invention relates to a new and improved simple form of count control mechanism and its association with feed wheel control mechanism and especially to count control mechanism which will control predetermined counts of a small number of coins, as 20 to 50 coins, as well as a count of a thousand or other larger number of coins.

The invention further consists in the several features hereinafter set forth and more particularly defined by claims at the conclusion hereof.

In the drawings:

Fig. 6 is a detailed horizontal sectional view taken on the line 6—6 of Fig. 3;

Fig. 7 is a partial end elevation view of the count control mechanism, parts being broken away and parts being shown in section;

Fig. 8 is a detailed vertical sectional view taken on the line 8—8 of Fig. 3;

Fig. 9 is a detailed vertical sectional view taken on the line 9—9 of Fig. 7;

Fig. 10 is a front elevation view of parts shown in Fig. 3 with the parts shown in a tripped position, parts being broken away;

Fig. 11 is a detailed vertical sectional view taken on the broken line 11—11 of Fig. 10;

Fig. 12 is a detailed vertical sectional view taken on the line 12—12 of Fig. 9;

Fig. 13 is a wiring diagram of the electrical system used in the machine;

Fig. 14 is a detailed vertical sectional view taken on the line 14—14 of Fig. 3;

Figs. 15 and 16 are views similar to Fig. 14 showing the parts in different positions;

Fig. 17 is a detailed vertical sectional view taken on the line 17—17 of Fig. 14;

Fig. 18 is a detailed horizontal sectional view taken on the line 18—18 of Fig. 15;

Fig. 19 is a detailed horizontal sectional view taken on the line 19—19 of Fig. 16;

Figure 1:
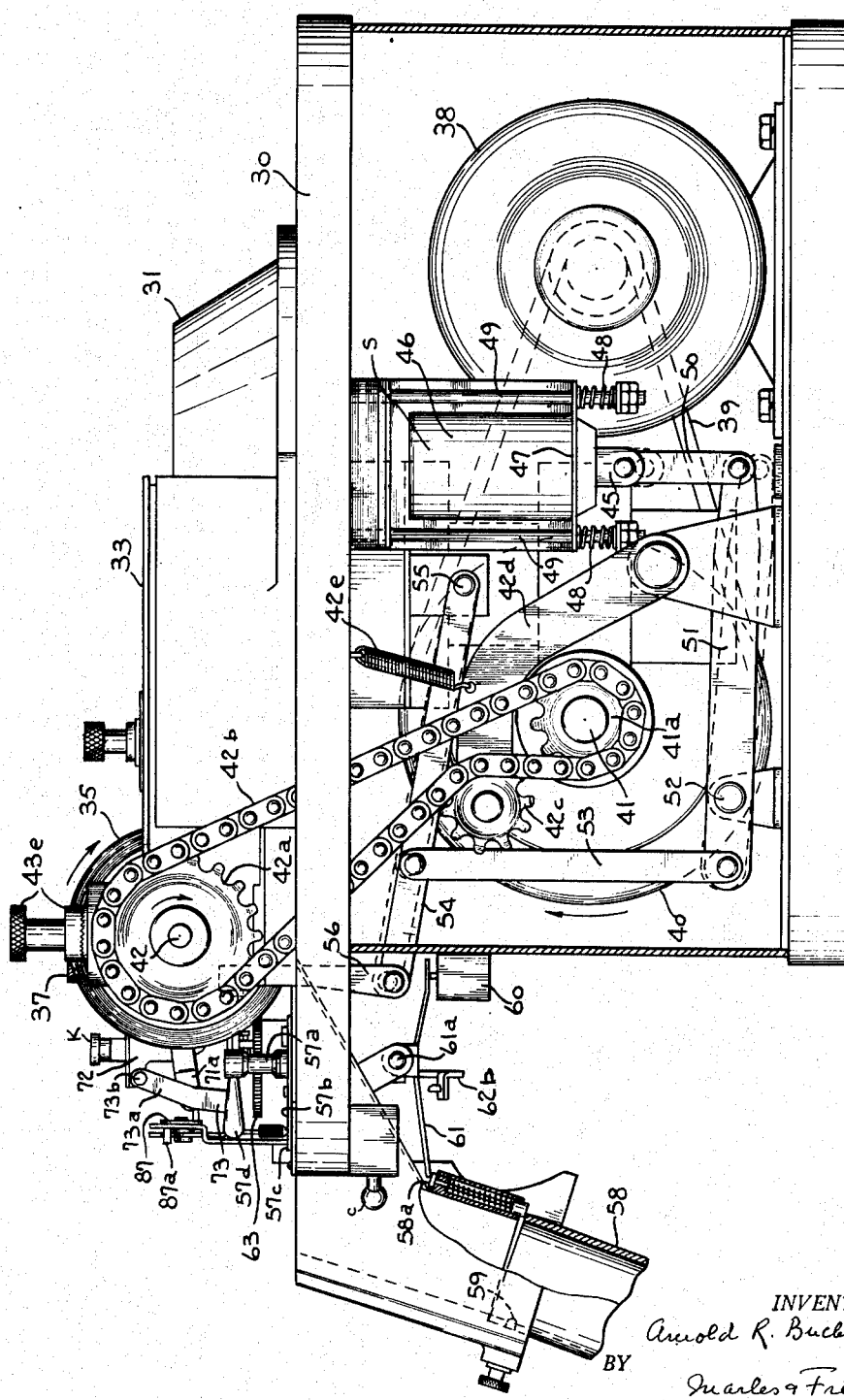
Fig. 1 is a side elevation view of a coin counting machine embodying the invention, parts being broken away and parts being shown in section.
Figure 2:
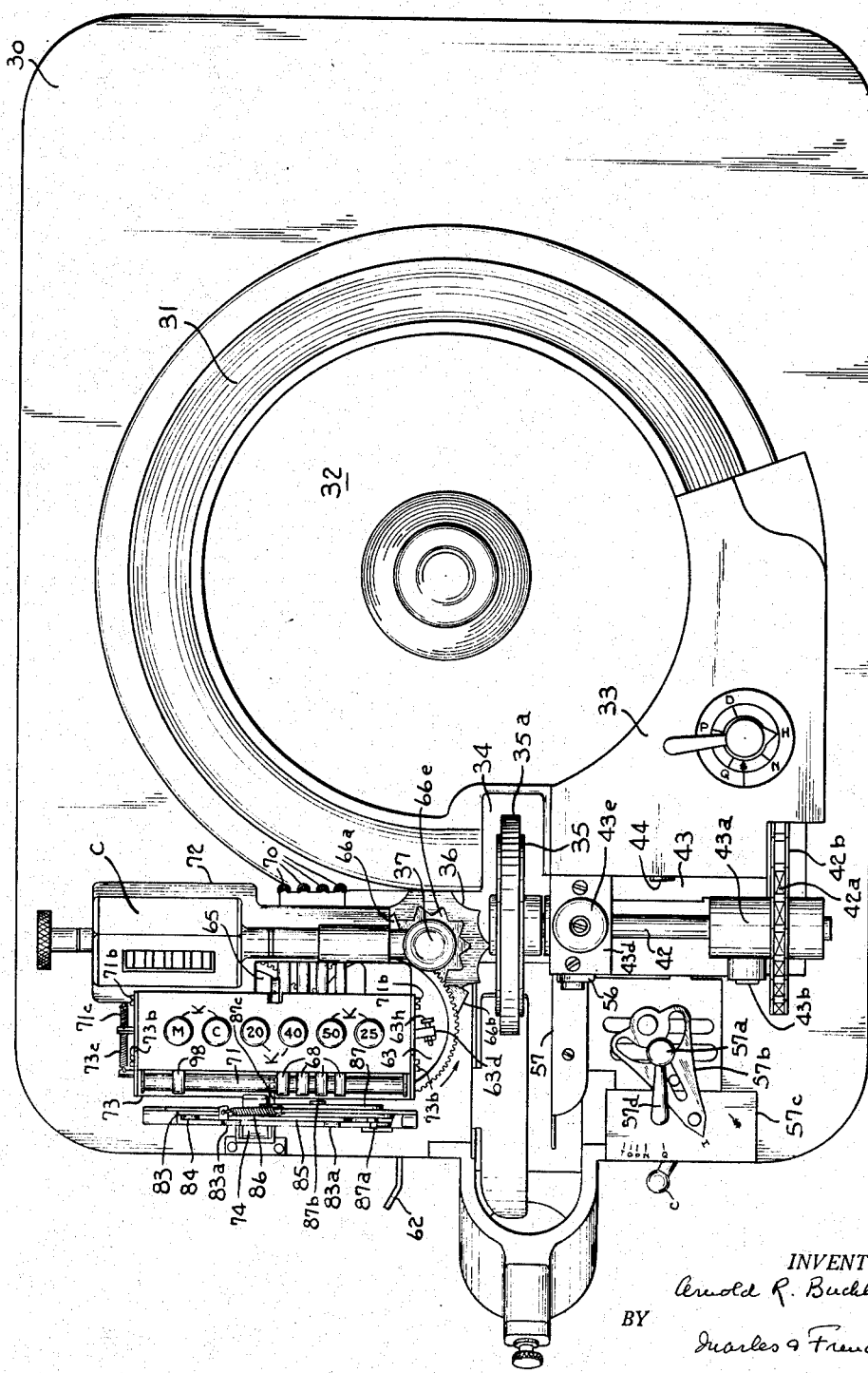
Fig. 2 is a top plan view of the machine.
Figure 3:
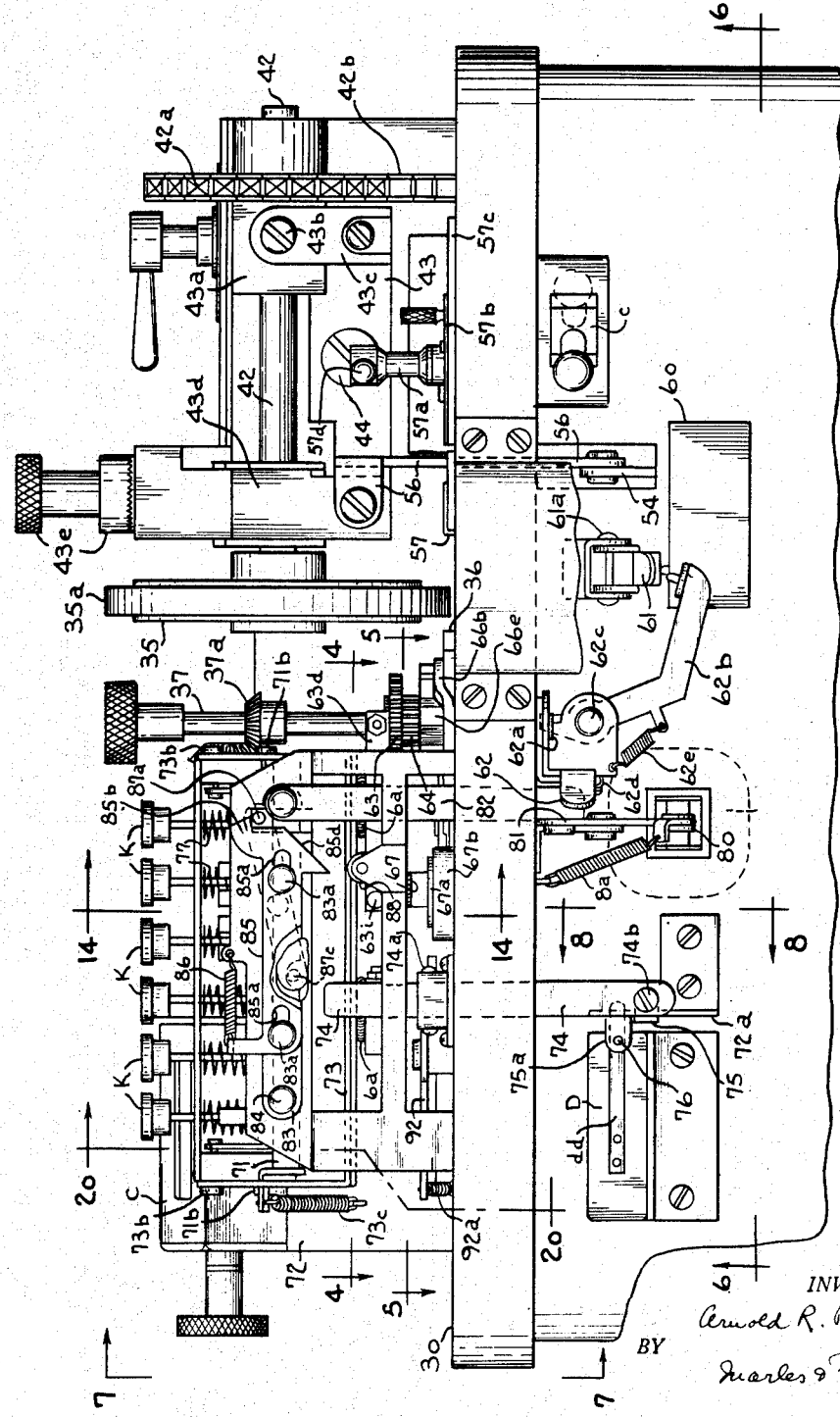
Fig. 3 is a front elevation view of the machine.

Referring to Figs. 1, 2, and 3 of the drawings, the machine includes a frame 30 having a hopper 31 provided with a rotary bottom 32 by which the coins deposited in the hopper are carried out by centrifugal force to a side discharge opening controlled by a vertically adjustable gate 33 and delivered to a passage 34 where they are engaged, one at a time, by a revolving feed wheel 35 which carries them into engagement with and past a star wheel 36 on a counter drive shaft 37 which is connected by a bevel gear drive including the gear 37a with a counter C. An electric drive motor 38 is connected by a belt 39 with a pulley 40 on a shaft 41 which in known manner (see Figs. 2 and 3 of U. S. Patent No. 2,438,822, dated March 30, 1948) is connected to the vertically disposed shaft carrying the plate or bottom 32 that is rotated continuously while the motor 38 is running.

The feed wheel 35 is mounted on a shaft 42 journalled in bearings carried by a tiltable support 43 which is pivotally mounted at 44 on the gate or block 33. The shaft 42 carries a sprocket 42a connected by a chain 42b with a sprocket 41a on the shaft 41 so that the wheel 35 is continuously rotated while the motor 38 is running. The chain 42b has a chain tightener or tensioner associated therewith comprising a sprocket 42c carried by a pivotally supported arm 42d urged by a spring 42e into a chain tensioning position.

The feed wheel 35 is moved into coin feeding position by linkage connecting the support 43 with the plunger 45 of a solenoid S whose energizing coil 46 is mounted on a square frame structure 47 carried by springs 48 at each corner from fixed rods 49 so as to relieve the shocks imparted to the frame by the action of the solenoid. The linkage above referred to includes a link 50 operatively connecting the plunger 45 with one end of a lever 51 pivoted on the machine frame at 52 and operatively connected by a link 53 with the intermediate portion of a lever 54 pivoted at one end on the machine frame at 55 and operatively connected at its other end by a link 56 with the support 43. As shown in Fig. 3, the rear bearing 43a is pivoted at 43b to a bracket arm 43c connected to the main support 43 and the front bearing for the shaft 42 is carried in a bearing box 43d which is slidably mounted in the support 43. This manner of mounting the shaft 42 permits of a manual adjustment of the shaft 42 relative to the block or support 43 by the raising or lowering of box 43d through a feed screw (not shown) connected with said box and operated by the hand knob 43e to compensate for the wear of the wheel's rubber facing 35a. The return of the feed wheel 35 to an inoperative position is provided by the action of the chain tensioner, including the spring 42e, which by its engagement with the chain 42b engaging the sprocket 41a on the shaft 41 normally acts to tilt this end of the shaft 41 downwardly and consequently the wheel carrying end upwardly.

In addition to the adjustable gauge block or gate 33 for coins of different denominations, a coin width gauge plate 57 for the coin delivery passage is provided. This plate is slidably mounted on the frame of the machine and operatively connected by a pin 57a to a settable lever 57b which is associated with an index plate 57c, said lever 57b being locked in an adjusted position by using the pin 57a as a clamp and providing it with a handle 57d for this purpose.

After the coins of any given denomination are counted, they pass down the discharge passage 34 into a delivery tube 58.

As in the prior Patent No. 2,438,822, above referred to, the delivery tube 58 is mounted on the machine for limited swinging movement about a pin 59, and this movement may be used to start the count by the operation of a starting or reset switch 60 (see Figs. 1, 3, and 13).

A switch operating lever 61 is pivoted on the machine at 61a and may be operated by pushing toward the right as viewed in Fig. 3, on the handle portion of a lever 62, pivoted on the machine at 62a and engageable with one arm of a lever 62b pivoted on the machine at 62c and at right angles to the pivot 62a, to swing said lever 62b upwardly against the lever 61 to move the switch 60 to a closed position, the levers 62 and 62b being retracted by springs 62d and 62e. Also the upward swinging of the tube 58 acts through a spring pressed slidably movable plunger 58a engageable with the lever 61 to swing said lever to close the switch 60 which controls the energization of a solenoid S'.

In Fig. 13 a wiring diagram for the motor and solenoid control circuits are shown including supply lines a and b shown as connected with the terminals of the solenoid S, the line a having a manually operated "on and off" switch c therein, and the line b having a normally closed switch D therein controlling solenoid S and in turn controlled by the count control or predetermined count mechanism P. Branch connectors e and f connect the motor M to the lines a and b beyond the switch c. Branch connectors g and h connect the solenoid S' with the lines a and b through the switch 60. Without going into a detailed explanation of the mechanism P, the operator first closes the switch c to start the motor M, and he sets the count control mechanism P for the desired number of coins, and then by turning the counter shaft 37 brings the count control mechanism to a position in which the switch D is open so that solenoid S is deenergized and feed wheel 35 is in its inoperative position. He then charges the hopper 31 and then closes the switch 60 by moving the lever 61 either by the swinging of the tube 58 or the lever 62 to energize the solenoid S'. Energization of solenoid S' acts through parts of the count control mechanism P to permit switch D to close and energize the solenoid S to bring the feed wheel 35, as previously described, to a coin feeding position, and then the coins are counted as they pass the star wheel 36. As the last of the predetermined number of coins is counted, parts of the mechanism P are operated to open the switch D and thus deenergize the solenoid S so that the feed wheel 35 moves up to its inoperative position.

Figure 4:
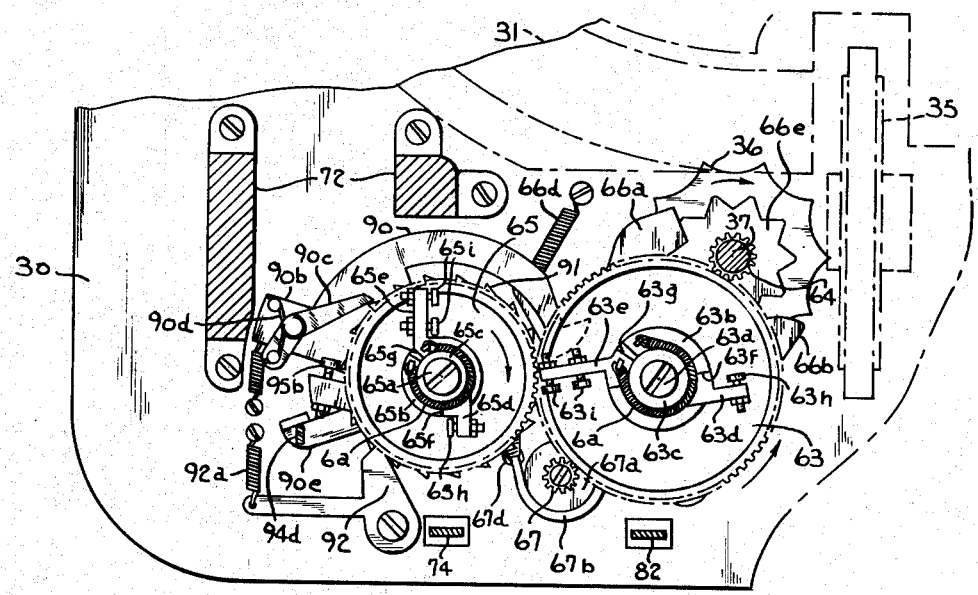
Fig. 4 is a detailed horizontal sectional view of the count control mechanism taken on the line 4—4 of Fig. 3.
Figure 5:
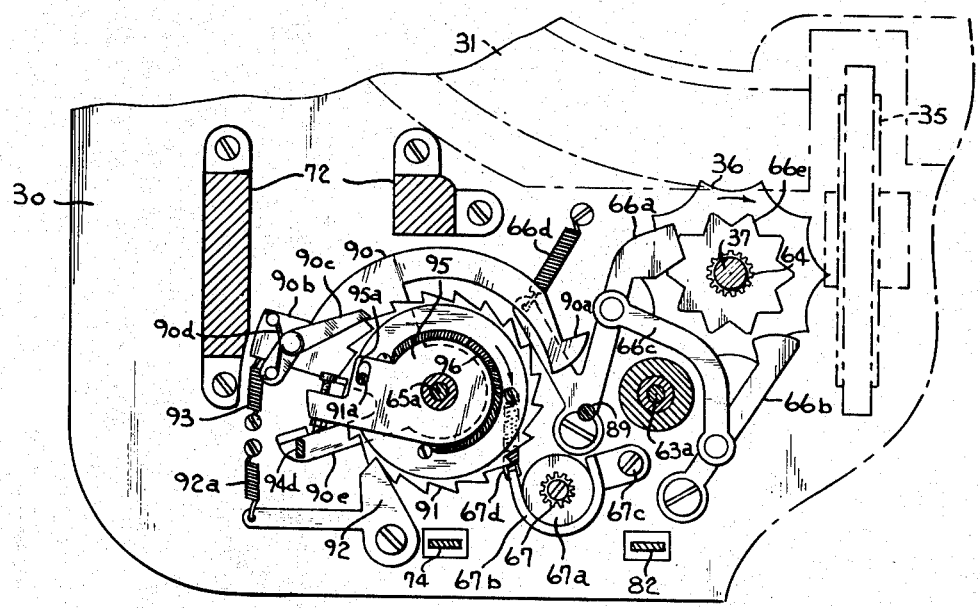
Fig. 5 is a detailed horizontal sectional view of the count control mechanism taken on the line 5—5 of Fig. 3.

Referring to Figs. 4 and 5, the count determining mechanism includes an eighty toothed gear wheel 63 meshing with a sixteen toothed gear wheel 64 on the counter drive shaft 37 and a sixty-four toothed gear wheel 65 meshing with the wheel 63 so that while the machine is running and the feed wheel 35 is feeding coins past the star wheel 36, a step by step rotation in the direction of the arrows is imparted to the gears 63 and 64 by the star wheel driven shaft 37. To prevent overrunning, a pair of alternating acting pivotally mounted holding pawls 66a and 66b connected by a link 66c are normally urged by a spring 66d into alternate engagement with a ratchet wheel 66e fast on the shaft 37. Also a small pinion 67 meshes with the gear 63 and carries a brake drum 67a, which is engaged by a brake member 67b pivoted at 67c urged to braking position by a spring 67d to keep the gears from spinning. The gear 67 is diametrically disposed relative to the gear 64 so as to neutralize the thrust on the gear 63. The gears 63 and 65 are each loosely mounted on stud shafts 63a and 65a and each have a fixed hub provided with an upstanding segmental ring portion 63b or 65b. Hub members 63c and 65c loosely mounted on the shafts 63a and 65a have short arms 63d and 65d and long arms 63e and 65e with stop surfaces 63f and 63g and 65f and 65g cooperating with the ends of the ring portions 63b and 65b to provide a limited movement of the hub members 63c and 65c relative to the ring portions 63b and 65b. The hub members 63c and 65c are normally biased to an engagement of one of their stop surfaces with the fixed hub portions of the gears in each instance by a coiled spring 6a anchored at one end to the fixed hub and at the other end to the associated movable hub.

The short arms 63d and 65d each have a single stop button 63h and 65h mounted thereon while the long arms 63e and 65e have radially spaced stop buttons 63i and 65i mounted thereon. With this arrangement if a stop member is brought into blocking relation with an associated stop button after either a half or full revolution of the gear 63 or 65, these gears and hence the counter drive shaft 37 will be stopped so that the feed wheel 35 cannot deliver any more coins past the star wheel 36. The stopping points of the gears 63 or 65 determine the number of coins fed past the counter, and to effect this a plurality of stops 68, selectively movable or settable into the path of the stop buttons above referred to are provided. Also associated with the settable stops is mechanism for controlling the switch D and reset mechanism operable by the solenoid S'.

Referring to Figs. 7, 9 and 11, and 14 to 18, each of the stops 68 includes a laminated lever 68a pivoted on a common pivot shaft 69 and normally urged toward its associated gear 63 or 65 by a spring 70. Each lever 68a has a finger projection 68b and a key slot 68c. Each lever 68a has a stop member 68d slidably mounted between its laminations and guided by pins 68e in the lever 68a working in a slot 68f in the member 68d. Each stop member 68d has a finger projection 68g. The finger projections 68b of all the stops cooperate with a common reset bar or member 71 having arms 71a pivotally mounted at 71b on the fixed frame 72 of the count control mechanism, which member 71 is normally held in the position shown in Fig. 14 by its own weight or by a spring 71c. The finger projections 68g of all the stops cooperate with a common angle bar 73 provided with arms 73a pivotally mounted at 73b on the frame 72 and normally urged by a spring 73c to the position shown in Figs. 7 and 14 determined by an adjustable set screw 73d on said bar. Bar 73 is engageable with one end of a lever 74 pivoted at 74a and engageable at its screw carrying end 74b with an angled slide 75 slidably guided in the bracket 72a, see Fig. 8, and having spaced arms 75a in which a plunger or button 76 is slidably mounted and normally urged by spring 76a toward the front arm 75a so that after the lever 74 moves both the slide 75 and the plunger 76 to a position in which said plunger engages and moves a switch arm dd to open the switch D, further movement of the lever 74 compresses the spring 76a. Opening of switch D deenergizes solenoid S and thereby permits feed wheel 53 to move to its inoperative position.

A series of settable keys K, each vertically slidably mounted in the frame 72, are provided to control the stops 68 for the smaller predetermined counts, the continuous count, and the larger predetermined count, respectively. As shown in Fig. 2, the keys are indicated by the letters and numerals M, C, 20, 40, 50, and 25 (M standing for a count of a thousand coins and C for a continuous count of coins). Each key K is normally moved to an inoperative position by a spring 77, and any one of the keys is held in its settable or stop lowering position by a common swingable locking bar or latch 78 (see Figs. 12 and 14) normally moved by a spring 78a to a position for locking engagement with a notch K2 in a depressed key. Each key has a cam surface K3 which on the depression of the key pushes the bar 78 outwardly as it passes said bar, and consequently after one of the keys K is depressed and locked by the bar, the depression of another key will through the cam K3 release the bar 78 from the first depressed key, and then as the second key reaches its fully depressed position, the bar 78 will swing back to hold this key until another key is depressed. Also any key may be released by operating the separate manually operated release lever 78c pivoted at 78d on the frame. Swinging of the upper end of lever 78c toward the right moves its lower end in the opposite direction to move bar 78 out of engagement with any depressed key as will be apparent from Fig. 12.

Figures 20, 21:
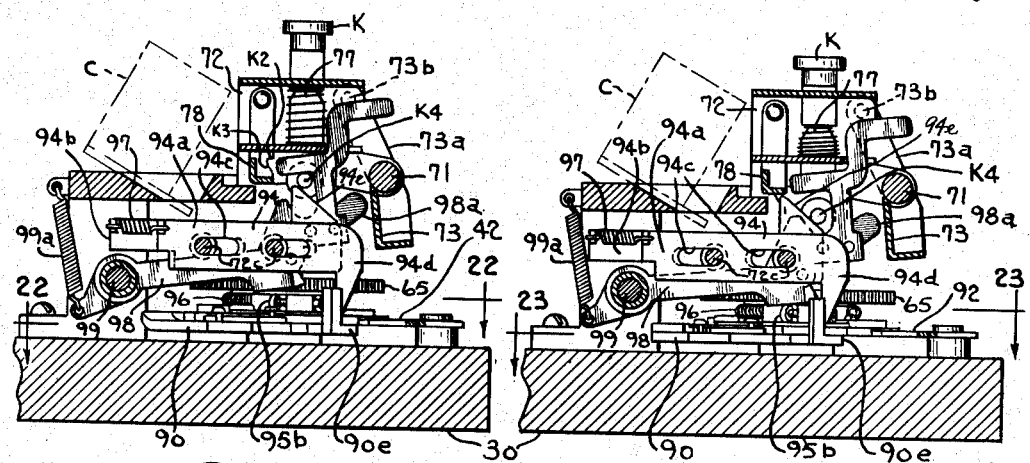
Fig. 20 is a detailed vertical sectional view taken on the line 20—20 of Fig. 3.
Fig. 21 is a view similar to Fig. 20 showing the parts in a different position.

With the exception of the continuous count key, each key carries a pin K4 which works in the slot 68c of its associated stop lever 68. When the key is depressed by the operator, the pin K4 moves down to the position shown in Fig. 14 so that the spring 70 may move the stop 68 down to the stop position shown. When the key K is released from the locking bar 78, the pin K4 engages the upper side of the slot 68c and, the spring 77 being stronger than the spring 70, the arm 68 is raised to an inoperative position as shown in Fig. 20.

As a typical example of the operation of a predetermined smaller count number of the count control mechanism, the 50 numbered key is shown in Figs. 14 to 16 as depressed. This sets the stop lever 68 controlled by that key so that the stop member 68d is moved down into the path of the outer stop button 63i, and assuming that the machine has been started and the coins are being counted and the gear 63 is being revolved, step by step, in the direction of the arrow, when the forty-ninth coin is passing the star wheel 36, the outer button 63i engages the stop member 68d as shown in Fig. 17 and, as the gear 63 continues to advance, member 68d is moved toward the right from the position shown in Fig. 17 to the position shown in Fig. 18 and through the finger projection 68g swings the switch D control bar 73 outwardly as shown in Fig. 15 and thus swings the upper end of the lever 74 outwardly or toward the right and its lower end toward the left (see Fig. 7) to move parts 75 and 76 and dd toward the left so that as the fiftieth coin is counted the movement of dd opens the switch D and the solenoid S deenergized, and consequently the feed wheel 35 is moved to its inoperative position, and at about the same time the stop member 68d abuts the lowered arm 68a so that the arm 63e is stopped from moving, and since the surface 63g of the movable hub part 63c has then been moved into engagement with the fixed hub portion 63b of the gear against the tension of the spring 6a and consequently, the gear 63 can no longer turn but is stopped from rotating and the counting cycle is stopped. To start another counting cycle of the same number of coins the reset bar 71 is swung upwardly to engage the finger 68b and swing the stop 68 upwardly to the position shown in Fig. 16, in which position the stop member 68d is out of the path of the button 63i so that the spring 73c swings the switch control bar 73 backwardly and this bar consequently pushes the stop member 68d back to its initial position and itself assumes a position in which the switch control lever 74 is in a release position so that switch D is free to close, rendering solenoid S operative to again bring the feed wheel 35 to its coin feeding position. If under these conditions, the stop arm 68 was again lowered to the position shown in Fig. 18, nothing would happen, but in that position since the spring 6a has been put under tension, as soon as the stop 68 moves up to the position shown in Fig. 16, the spring 6a acts on the hub member 63c to shift it angularly to the position shown in Fig. 19 which limited amount of angular movement is sufficient to permit the stop member 68d in descending to move back of the arm 63e so that the gear 63 can revolve in the direction of the arrow. Thus the lost motion connection between the movable stop carrying hubs for the gears 63 or 65 and the fixed hub of these gears permit the stops 68 to come down to a count stopping position after being momentarily lifted to the position shown in Fig. 16 by the reset bar 71.

The reset bar 71 is lifted to start a new count when the switch 60 is closed by the operator and the solenoid S' is energized. Referring to Figs. 3, 10, and 11, the plunger 79 of the solenoid S' is operatively connected by a link 80 with one arm of a bell crank 81 whose other arm is operatively connected by a link 82 with a lever 83 pivoted at 84 on the frame 72. A spring 8a acting through the lever 81 returns the above named parts to their initial position. The lever 83 through pins 83a thereon carries a slidable latch member 85 provided with slots 85a in which the pins 83a work and with a latch portion 85b having a cam surface 85c and a cam surface 85d. Member 85 is normally urged to a latching position by a spring 86. The latch 85b is adapted under the action of spring 86 to engage a pin 87a on one end of a lever 87 medially pivoted on the frame 72 at 87b and carrying a pin 87c engageable in a notch (shown in dotted in Figs. 3 and 10 and in full in Fig. 11) in the reset bar 71. A roller 88 journalled in bearings on the frame 72 cooperates with the cam surface 85d to move the latch 85 to a release position on the downward movement of the lever 83 as shown in Fig. 10. The lever 87 moves with the bar 71. With this arrangement, when the reset bar 71 is in its lowered position Figs. 14 and 15, the lever 83 under the action of the spring 8a, lever 81, and link 82 is in its raised position, and the latch 85c is engaged over the pin 87a of the lever 87. As soon as the solenoid S' is energized by closing of the start control switch 60, its plunger 79 acting through link 80, lever 81, link 82, lever 83, and latch 85 pulls the latched end of the lever 87 downwardly to near the position shown in Fig. 10, thereby raising the bar 71 to its reset position, and immediately thereafter the cam surface 85d engages the roller 88 to push the latch 85 to the release position shown in Fig. 10 as the lever 83 moves to its lowest position. With the parts in the position shown in Fig. 10, the spring 71c acting through the bar 71, swings the lever 87 back to its initial position. As soon as solenoid S' is deenergized, the lever 83 and latch 85 are swung upwardly by the spring 86 to a latched association with the lever 87, the cam surface 85c of the latch 85 during this movement engaging the pin 87a which acts against said surface to push the latch 85 backwardly against the action of the spring 86 until the latch 85b can snap by and latch over the pin 87a ready to repeat the cycle.

It will be noted that the above described mechanism provides only a momentary raising of the bar 71 sufficient for the resetting of any one of the stops 68 and that the lever 87 is not held down while the solenoid operated linkage is in a down or energized position so that even though the operator may hold either the tube 58 or the lever 61 in a position to close the switch 60, the count will be started at the right time and does not depend upon the operator's release of the switch 60.

Where a greater predetermined count of coins, for example, one thousand, is desired, mechanism is provided herein for effecting a multiple operation of one of the gears 63 or 65 to effect this count, and more particularly the gear 63 for counting fifty coins is used, said gear provided with drive pin 89, which (see Figs. 14, 22, 23, 26, and 27) is adapted to engage at each revolution for twenty rotations of the gear 63 with a drive member 90 loose on the shaft 65a and having a pawl and ratchet drive connection with a ratchet wheel 91 also loose on shaft 65a and normally held against movement by a pivoted holding pawl 92 urged against it by a spring 92a. Member 90 is provided with a tooth 90a adapted, when in operative position, to be intermittently engaged by the pin 89, said member being moved to a normally inoperative position by a spring 93 connected with its arm 90b which also has a drive pawl 90c pivotally mounted thereon and urged against the ratchet wheel 91 by a spiral spring 90d. Member 90 has an arm 90e adapted to be engaged by a settable member 94 to move said member 90 from the position shown in Fig. 22 to the position shown in Fig. 23. A hub member 95 similar to the member 63c is loosely mounted on the shaft 65a, has an arcuate slot 95a cooperating with a pin 91a on wheel 91 to provide a lost motion connection, is urged by a spring 96 to one of its limits of movement and is provided with a stop button 95b.

On the depression of the key K lettered M the member 90 is swung to its operative position, and a stop is brought into cooperative relation with the button 95b in a manner similar to the stop 68 through the mechanism shown in Figs. 20, 21, 24, and 25. Referring to these figures, the settable member 94 is formed by two members 94a and 94b, both slidably mounted on the frame 72 through slots 94c in said members and pins 72c fixed to said frame and connected together for movement together and relative to each other by a spring 97 which permits overtravel of the arm 90e. The member 94a has a hooked end 94d engageable with the arm 90e, and the member 94b has a cam surface 94e engaged by the pin K4 of the key so that in the movement of the key from its release position shown in Fig. 20 to its depressed position shown in Fig. 21, the drive member 90 is shifted as previously described to its operating position by the movement of the member 94a through its spring connection 97 with the member 94b.

Figure 25:
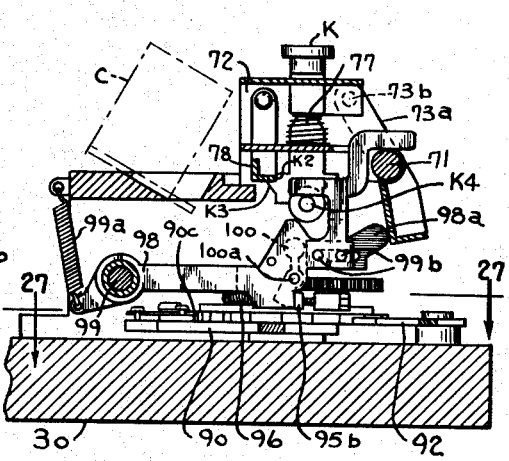
Figure 26:
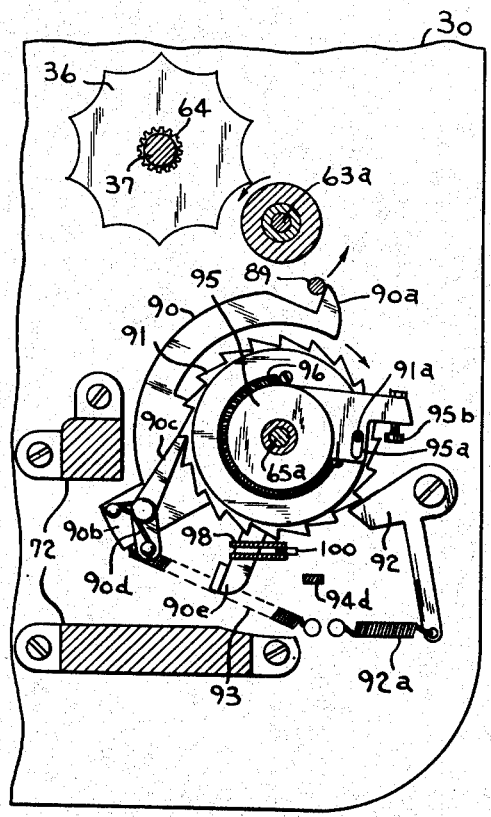
Fig. 26 is a detailed horizontal sectional view taken on the line 26—26 of Fig. 24.

A stop member or lever 98, similar to the member 68, is pivoted at its rear end on a supporting shaft 99 and normally urged to its operative position by a spring 99a. A switch throw out finger 98a, similar in function to the member 68d, is slidably mounted on pins 99b on the lever 98 and adapted to engage the bar 73 and shift said bar to move the lever 74 in the same way as member 68d. Instead of moving the finger 98a directly as in the case of the fingers 68g for the smaller predetermined counts, the finger 98a is moved indirectly from the lever 98 by a lever 100 pivoted on the lever 98 at 100a and having one of its arms positioned to engage the member 98a and its other arm disposed in a position to be engaged by the stop button 95b as the same swings around to complete the thousand count, and this lever 100 swings back, as shown in Fig. 25, into engagement with the stop lever 98a when the ratchet 91 is stopped from rotating through the engagement of the button 95b with the lever 98.

Figures 22, 23:
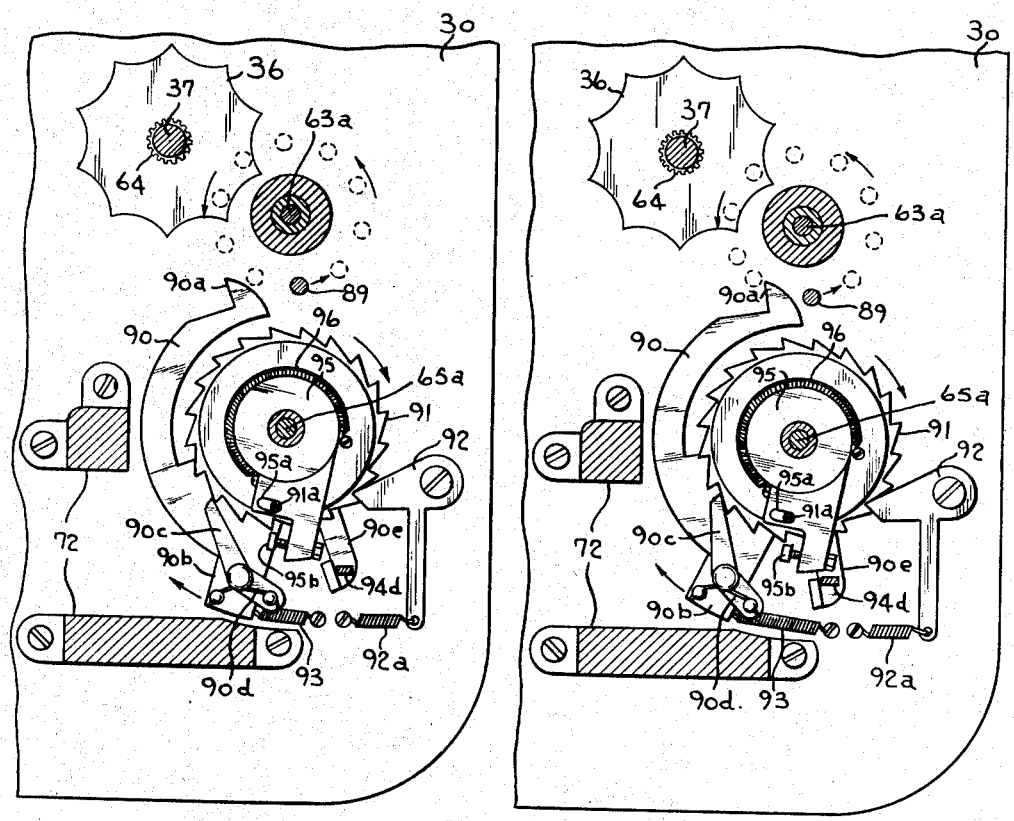
Fig. 22 is a detailed horizontal sectional view taken on the line 22—22 of Fig. 20.
Fig. 23 is a detailed horizontal sectional view taken on the line 23—23 of Fig. 21.
Figure 24:
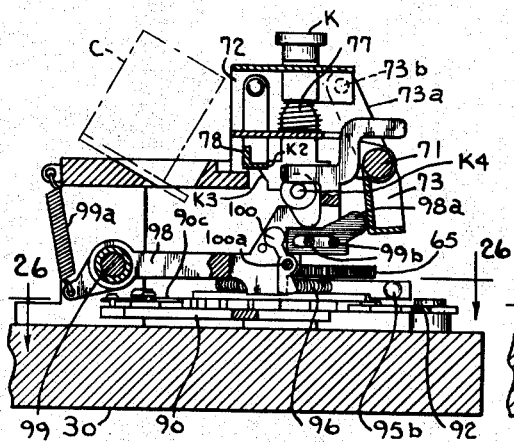
Figs. 24 and 25 are detailed vertical sectional views similar to Fig. 20 showing the parts in different positions.
Figure 27:
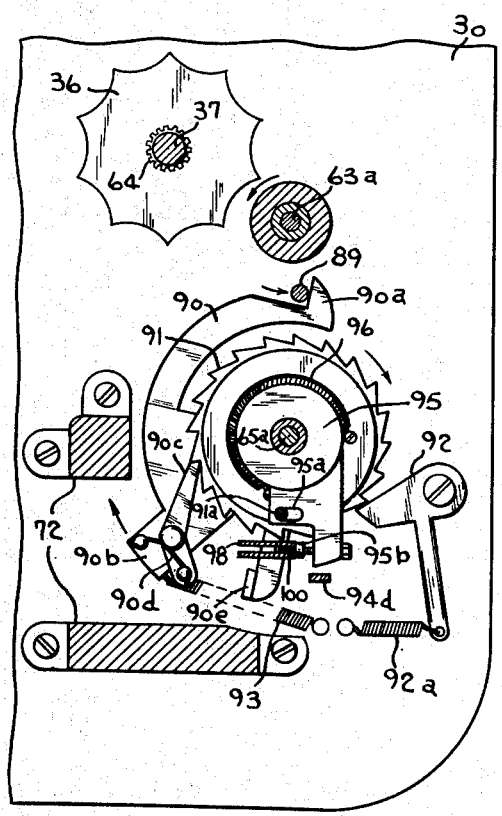
Fig. 27 is a horizontal sectional view taken on the line 27—27 of Fig. 25.

When the "M" lettered key K is depressed, the mechanism is set for counting a thousand coins of any one denomination or a multiple of the coins counted by the mechanism used for a smaller number of coins, and from the above description it will be noted that the depression of this key moves the drive member 90 in operative relation with the pin 89 on the gear wheel 63 and also sets the stop member 98 in a position so that after twenty rotations of the wheel 63 and twenty successive actuations of the drive member 90 as the pin 89 engages and releases from the tooth 90a, as shown in Figs. 22, 23, 26, and 27, the ratchet wheel 91 is advanced twenty teeth, and the arm 95 is likewise moved around from its position shown in Fig. 22 to the position shown in Fig. 27, which is just before its final stopping movement by the movement of the pin 91a to the other end of the slot 95a and the movement of the holding pawl 92 into engagement with the twentieth tooth of the ratchet. When, as previously described, the button 95b shifts the lever 100 and the finger 98a to move the bar 73, the switch D is opened, the solenoid S deenergized, and the feed wheel is then moved to its inoperative position by the parts previously described. In connection with the thousand or greater number count, the lost motion connection provided by the slot 95a permits the spring 96 to swing the arm 95 out of interfering relation with the stop 98 in the same way that the lost motion connection between the member 63c functions with the gear 63 to swing the arms 63e or 63d out of interfering relation with the stops 68a.

It is to be noted that the count control mechanism herein described may be used with counting machines of the general type above described in which instead of the counting wheel being continuously driven, said wheel is driven intermittently by a clutch connection with a continuously rotating shaft as, for example, in the prior U. S. Patent No. 2,378,828, to A. R. Buchholz et al., of June 19, 1945, in which instance the solenoid S herein instead of acting to move the drive shaft from an inoperative to an operative position would be used to effect engagement of the clutch without departing from the invention.

I desire it to be understood that this invention is not to be limited to any particular form or arrangement of parts except in so far as such limitations are included in the claims.

What I claim as my invention is:

1. In a coin counting machine, the combination of a hopper, means for discharging coins from said hopper, a counter, a coin operated star wheel for driving said counter, a feed wheel engageable with the coins for forcing the same past said star wheel, settable count control mechanism including a gear member rotated by said star wheel, and means controlled by said count control mechanism for controlling the effective feed of said feed wheel, said count control mechanism including means operated by said member to effect a predetermined number count of coins, and means for effecting a predetermined count of a greater number of coins driven by a successive number of operations of said gear member.

2. In a coin counting machine, the combination of a frame, a hopper, means for discharging coins from said hopper, a counter, a coin operated star wheel for driving said counter, a tiltable continuously driven feed wheel engageable with the coins for forcing the same past said star wheel, count control mechanism, a solenoid having its coil resiliently supported on said frame and a plunger operatively connected to the shaft for said feed wheel for moving said feed wheel into coin feeding position on the energization of said coil, an electrical circuit for supplying current to said solenoid, and a control switch in said circuit controlled by said count control mechanism, and means for moving said feed wheel to an inoperative position on the opening of said control switch.

3. In a coin counting machine, the combination of a counter, count control mechanism, a coin operated star wheel operatively connected to said counter and to said count control mechanism and a feed wheel engageable with the coins for forcing the same past said star wheel, said count control mechanism including a rotary member, key controlled stops selectively engageable with said member for effecting predetermined number of counts of coins, a second rotary member, means for driving said second member from said first member to effect a predetermined count of a greater number of coins, another key, means controlled by said other key for establishing the driving connection between said members, and a stop also controlled by said other key for said second rotary member, and means associated with said first named key controlled stops and said last named stop for stopping the effective feed of said feed wheel.

4. In a coin counting machine, the combination of a hopper, means for discharging coins from said hopper, a counter, a coin operated star wheel for driving said counter, a continuously rotating feed wheel engageable in its operative position successively with the coins from said hopper for forcing the same past said star wheel, a tiltable shaft for said feed wheel, means for continuously rotating said shaft, predetermined count control mechanism, a solenoid including a coil and a plunger, means operatively connecting said plunger to said tiltable shaft to move said feed wheel to its operative coin feeding position on the energization of said coil, an electrical circuit for supplying current to said coil, a control switch in said circuit controlled by said predetermined count control mechanism, and means for moving said shaft and feed wheel to an inoperative position on the opening of said control switch.

5. In a coin counting machine, the combination of a hopper, means for discharging coins from said hopper, a counter, a coin operated star wheel for driving said counter, a feed wheel engageable with the coins for forcing the same past said star wheel, predetermined count control mechanism comprising gearing rotated by said star wheel having radially disposed stops, settable stop means cooperating with the stops on said gearing for predetermining the movement of said gearing and star wheel, operator controlled keys controlling the movement of said stop means to operative position, reset mechanism for momentarily moving a preset stop to an inoperative position, and means including any one of said settable stop means of said predetermined count control mechanism for controlling the effective feed of said feed wheel.

6. In predetermined count control mechanism for a coin counting machine, the combination of gearing operated by the coin operated counter drive member of said machine, said gearing having radially disposed stops, settable stop means cooperating with the stops on said gearing for predetermining the movement of said gearing comprising levers and stops movably mounted on said levers, operator controlled keys controlling the movement of said levers to their stop positions, means controlled by the movement of said movably mounted stops for controlling the effective feed of said feed wheel, and reset mechanism for momentarily moving any preset lever and its stop to an inoperative position.

7. Predetermined count control mechanism as defined in claim 6, in which the reset mechanism includes a movable reset bar engageable with any preset lever to move it and its stop to an inoperative position, a lever for moving said bar to its reset position, a lever having momentarily latched engagement with the lever for moving said bar, and means for moving said momentarily latched lever.

8. Predetermined count control mechanism as defined in claim 6, in which the reset mechanism includes a movable reset bar engageable with any preset lever to move it and its stop to an inoperative position, a lever for moving said bar, a lever having momentarily latched engagement with the lever for moving said bar, and means including a solenoid for moving said momentarily latched lever, an electrical circuit for energizing said solenoid, and a control switch in said circuit.

9. In a coin counting machine, the combination of a hopper, means for discharging coins from said hopper, a counter, a coin operated star wheel for driving said counter, a feed wheel engageable with the coins for forcing the same past said star wheel, predetermined count control mechanism including a gear rotated by said star wheel and means controlled by said count control mechanism for controlling the effective feed of said feed wheel, said count control mechanism including means operated by said gear to effect a predetermined number of count of coins, and means for effecting a predetermined count of a greater number of coins comprising a drive member on said gear, a ratchet and a pawl engaging said ratchet and operated by the drive member on said gear on each complete rotation of said gear, a stop member mounted on said ratchet and a settable stop member engageable with the stop member on said ratchet to stop the movement of said ratchet and the pawl engaged therewith and the gear member after a predetermined number of revolutions of said gear.

10. In a coin counting machine, the combination of a hopper, means for discharging coins from said hopper, a counter, a feed wheel engageable with the coins for forcing the same past said star wheel, count control mechanism including gearing rotated by said star wheel and settable key controlled stop means for predetermining the movement of said gearing, means for effecting a multiple predetermined movement of said gearing including a pawl and ratchet mechanism settable to have its pawl driven by predetermined successive operations of said gearing, one of said key controlled stop means controlling the setting of said pawl, and means controlled by said count control mechanism for controlling the effective feed of said feed wheel.

11. In a coin counting machine, the combination of a hopper, means for discharging coins from said hopper, a counter, a coin operated star wheel for driving said counter, a tiltable continuously driven feed wheel engageable with the coins for forcing the same past said star wheel, predetermined count control mechanism comprising gearing rotated by said star wheel having radially disposed stops and settable stop means cooperating with the stops on said gearing for predetermining the movement of said gearing and star wheel, operator controlled keys controlling the movement of said stop means to operative position, reset mechanism for momentarily moving a pre-set stop to an inoperative position, a solenoid having a coil and a plunger operatively connected to the shaft for said feed wheel for moving said feed wheel into coin feeding position on the energization of said coil, an electrical circuit for supplying current to said solenoid, a starting count control switch in said circuit to energize said coil and move said plunger and feed wheel into coin feeding position, and a second control switch in said circuit controlled by the operation of any one of the settable stop means of the predetermined count control mechanism to open said circuit to deenergize said coil, and means for moving said shaft and feed wheel to an inoperative position on the opening of said second control switch.

References Cited in the file of this patent

UNITED STATES PATENTS

| Number | Name | Date |
|---|---|---|
| 1,128,561 | Webendorfer | Feb. 16, 1915 |
| 1,805,079 | Donnellan | May 12, 1931 |
| 2,083,256 | Donnellan | June 8, 1937 |
| 2,153,160 | Seemel | Apr. 4, 1939 |
| 2,165,241 | Downey | July 11, 1939 |
| 2,438,822 | Quirk | Mar. 30, 1948 |